(12) United States Patent
Backstrom

(10) Patent No.: US 6,289,214 B1
(45) Date of Patent: Sep. 11, 2001

(54) SYSTEMS AND METHODS FOR DEACTIVATING A CELLULAR RADIOTELEPHONE SYSTEM USING AN ANSI-41 SHORT MESSAGE SERVICE EMAIL

(75) Inventor: Olof Tomas Backstrom, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/087,085

(22) Filed: May 29, 1998

(51) Int. Cl.[7] .......................... H04M 11/00; H04M 3/42; H04Q 7/20
(52) U.S. Cl. .......................... 455/422; 412/414; 412/466
(58) Field of Search .................................. 455/412–414, 455/722, 445, 466; 370/328, 338, 352, 401, 466; 709/225, 229, 227, 243

(56) References Cited

U.S. PATENT DOCUMENTS

| | | | |
|---|---|---|---|
| 5,245,610 | * | 9/1993 | Lindell ................................. 370/95.1 |
| 5,537,467 | | 7/1996 | Cheng et al. ......................... 379/211 |
| 5,933,773 | * | 8/1999 | Barvesten ............................ 455/411 |
| 5,966,663 | * | 10/1999 | Gleason .............................. 455/466 |
| 6,011,969 | * | 6/1998 | Vargas et al. ........................ 455/423 |
| 6,151,507 | * | 11/2000 | Laiho et al. ......................... 455/466 |

FOREIGN PATENT DOCUMENTS 0 651 586 A2   8/1994   (EP) ................................ H04Q/7/20

OTHER PUBLICATIONS

Copy of International Search Report for PCT/US 99/08311.
Telecommunications Industry Association, ANSI–41, Chapters 1,3,5 and 6.
Telecommunications Industry Association, ANSI–664, TR45, Cellular Features Description, 1995, pp. i–viii,1–4, 239–254.

\* cited by examiner

*Primary Examiner*—Daniel Hunter
*Assistant Examiner*—Meless Zewdu N.
(74) *Attorney, Agent, or Firm*—Myers Bigel Sibley & Sajovec

(57) ABSTRACT

A cellular radiotelephone system including a Cellular Radio Exchange (CRE) and a plurality of radio heads (base stations) is deactivated, by sending an email including a deactivation message to the CRE via a communications protocol other than TCP/IP, such that the CRE deactivates the cellular radiotelephone system in response to receipt of the email including the deactivation message. Preferably, the email including the deactivation message is sent to the CRE via ANSI-41 communications protocol that is also used to communicate messages for automatic roaming, authentication, voice privacy and other services. Most preferably, the email including the deactivation message is sent to the CRE via ANSI-41 Short Message Service (SMS) communications protocol that supports email between a cellular operator system and a cellular radiotelephone system. The deactivation message may be processed by receiving the email including the deactivation message at the CRE via the communications protocol other than TCP/IP, preferably ANSI-41 and most preferably ANSI-41 SMS. A "fictitious" radiotelephone is assigned at the CRE for receipt of the ANSI-41 SMS deactivation email. The received email is sent to the fictitious radiotelephone using ANSI-41 SMS communications protocol. The fictitious radiotelephone converts the ANSI-41 SMS email to a TCP/IP email. The converted email is then used to deactivate the cellular radiotelephone system.

17 Claims, 6 Drawing Sheets

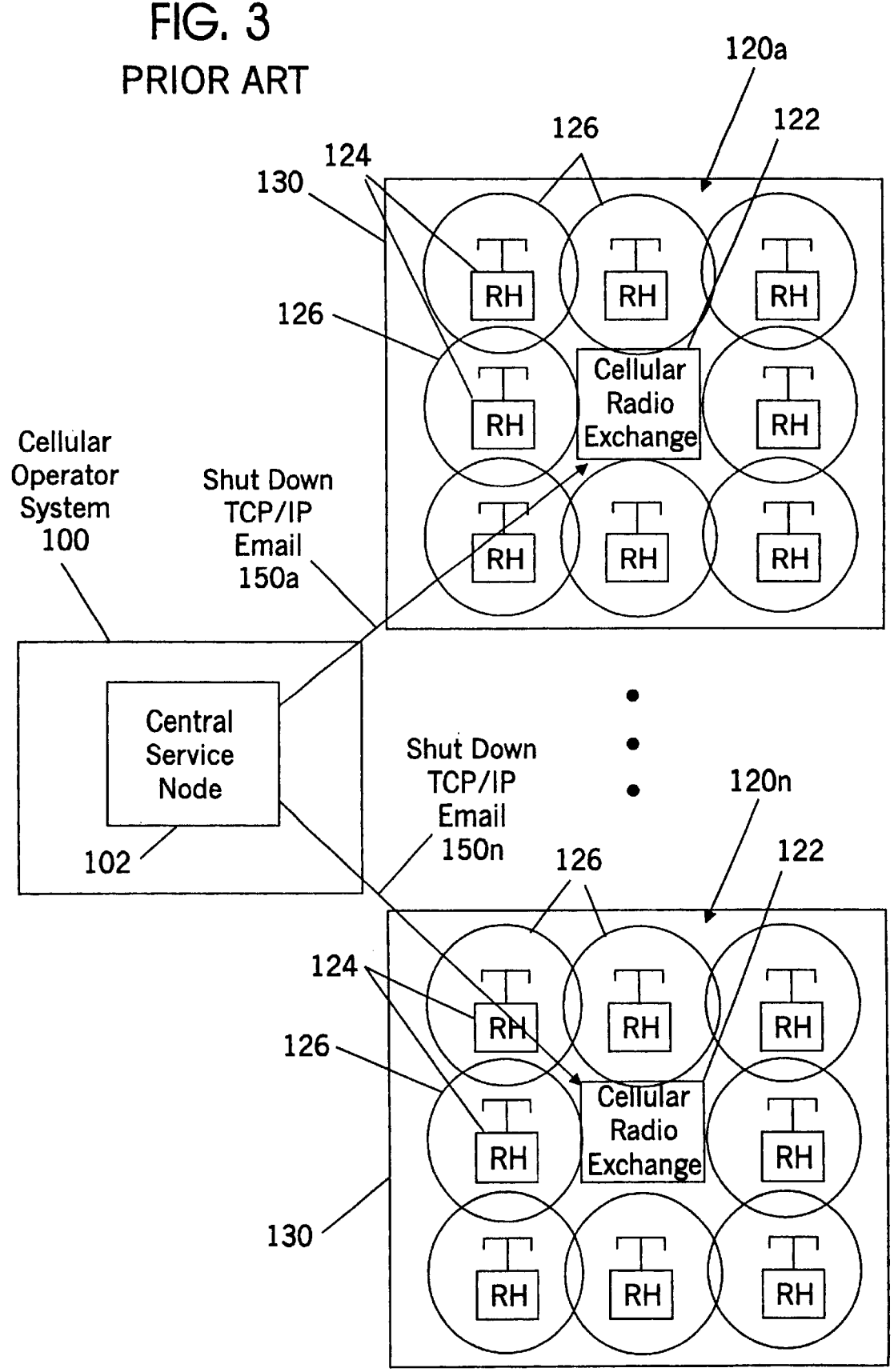

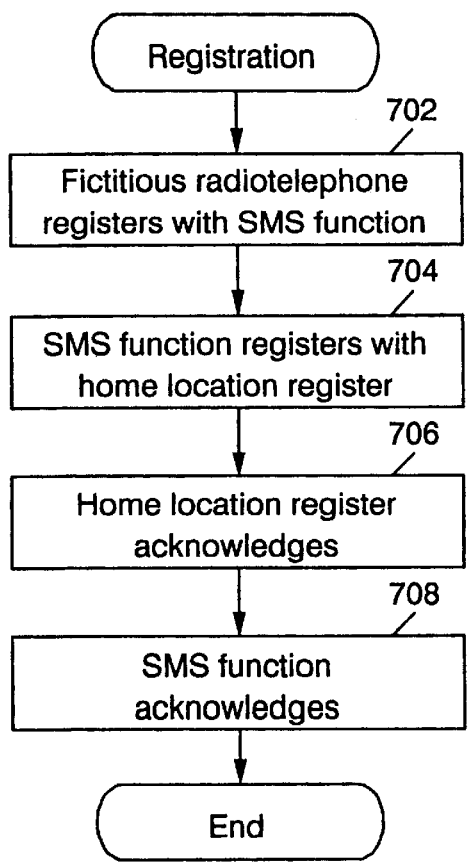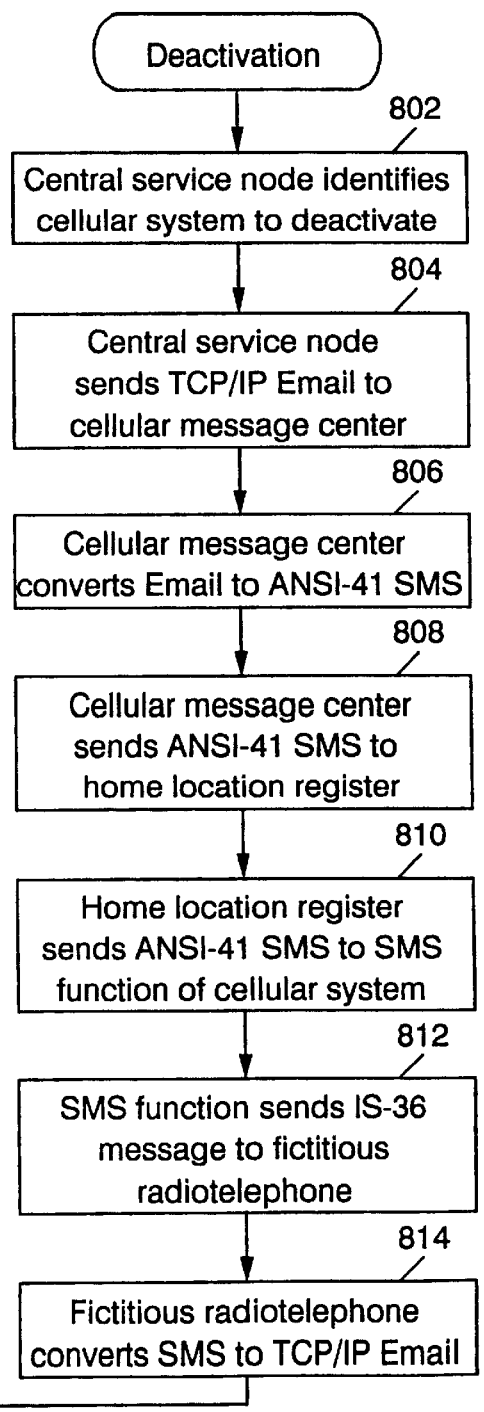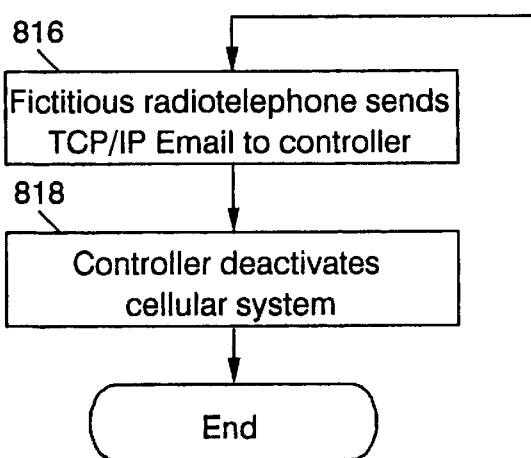

SYSTEMS AND METHODS FOR DEACTIVATING A CELLULAR RADIOTELEPHONE SYSTEM USING AN ANSI-41 SHORT MESSAGE SERVICE EMAIL

FIELD OF THE INVENTION

This invention relates to communications systems and methods, and in particular to radiotelephone communications systems and methods.

BACKGROUND OF THE INVENTION

Cellular radiotelephone systems are commonly employed to provide voice and data communications to a plurality of subscribers. For example, analog cellular radiotelephone systems, such as designated AMPS, ETACS, NMT-450, and NMT-900, have been deployed successfully throughout the world. More recently, digital cellular radiotelephone systems such as designated IS-54B in North America and the pan-European GSM system have been introduced. These systems, and others, are described, for example, in the book titled *Cellular Radio Systems* by Balston, et al., published by Artech House, Norwood, Mass., 1993.

Multiple cellular radiotelephone systems may be controlled by a common cellular operator. For example, in a large geographic area, multiple cellular radiotelephone systems may be under control of a single cellular operator. Moreover, with the advent of microcell technology, a microcellular radiotelephone system may be included within the geographic coverage of a macrocellular radiotelephone system and controlled by a common cellular operator. Finally, a Wireless Office System (WOS) may be located in a building to provide cellular radiotelephone communication among cellular radiotelephones that are located in the building. The Wireless Office System may be operated by the common cellular operator for the geographic area in which the Wireless Office System is located.

When a common cellular operator controls multiple cellular radiotelephone systems, communications generally take place between the common cellular operator's cellular operator system and the multiple cellular radiotelephone systems. More specifically, communications may take place between the central service node of a cellular operator system and the Cellular Radio Exchange (CRE) of each of the cellular radiotelephone systems.

These communications may allow the cellular operator to control the frequency allocation among the cellular radiotelephone systems, so as to reduce interference. These communications may also allow the cellular operator to deactivate a selected one of the cellular radiotelephone systems, for example due to nonpayment of bills by the owner of the selected cellular radiotelephone system. For example, when a cellular operator controls many Wireless Office Systems, it may be desirable to allow the cellular operator to deactivate one or more of the Wireless Office Systems upon nonpayment of bills.

Conventionally, deactivation of a cellular radiotelephone system by a cellular operator system is accomplished by sending a deactivation message from the cellular operator system to the selected cellular radio exchange. The deactivation message may be sent by electronic mail (email) using Transmission Control Protocol/Internet Protocol (TCP/IP). As is well known to those having skill in the art, the TCP/IP communications protocol utilizes an IP address to route messages between networked computers and networks of networked computers. The TCP/IP communications protocol is well known to those having skill in the art, and need not be described further herein.

Generally, a cellular radiotelephone system may be deactivated by the cellular operator by sending a "shut down" message in an email via TCP/IP communications protocol or by failing to send a "keep alive" message in an email via the TCP/IP communications protocol. Each of these deactivation techniques will now be described.

Referring now to FIG. 1, the sending of a "keep alive" message via a TCP/IP communications protocol email will now be described. As shown in FIG. 1, a cellular operator system 100 controls a plurality of cellular radiotelephone systems 120a–120n. The cellular operator system includes a central service node 102. Each cellular radiotelephone system 120a–120n includes a cellular radio exchange 122 that communicates with a plurality of base stations, also referred to as radio heads (RH) 124 in a plurality of cells 126. A plurality of cellular radiotelephones, not shown in FIG. 1, communicate with the radio heads 124 in the cells 126. In FIG. 1, the cellular radiotelephone systems are Wireless Office Systems that are located on a floor 130 of an office building. However, the cellular radiotelephone systems 120a–120n may be other conventional cellular radiotelephone systems.

Still referring to FIG. 1, in order to deactivate a selected cellular radiotelephone system 120a–120n, the central service node of the cellular operator system 100 sends a "keep alive" email message to the cellular radiotelephone systems 120a–120n except for the selected cellular radiotelephone system, using a TCP/IP line 150a–150n, and withholds the "keep alive" message from the cellular radio exchange 122 of the selected radiotelephone system. The TCP/IP email links 150a–150n may be the internet, an intranet, a dial-up modem or any other TCP/IP-based link.

Stated differently, the cellular operator system 100 identifies cellular radiotelephone systems that have and have not paid their bills. The central service node 102 sends a "keep alive" message as an encrypted TCP/IP email via TCP/IP communication links 150a–150n, to those cellular radiotelephone systems that have paid their bills.

FIG. 2 is a flowchart illustrating a "keep alive" function at the cellular radio exchange 122. As described in FIG. 2, the cellular radio exchange waits for a predetermined time, for example 12 hours, at Block 202. A determination is then made at Block 204 as to whether the "keep alive" message was received. If yes, then the grace period is set, for example to 48 hours, at Block 206. If the "keep alive" message was not received, then 12 hours is deducted from the grace period at Block 208. If the grace period becomes zero at Block 210, then the cellular radiotelephone system shuts itself down at Block 212. If the grace period is not zero, then the "keep alive" function returns to Block 202 to wait another 12 hours. Accordingly, if a cellular radiotelephone system 120a–120n receives the "keep alive" message, it is allowed to stay in operation. If not, the cellular radiotelephone system shuts itself down after a fairly long grace period.

Unfortunately, the use of a "keep alive" message may cause cellular radiotelephone systems that have paid their bills to inadvertently deactivate if one or more "keep alive" email messages are not properly received by the cellular radio exchange 122. For example, the internet or other TCP/IP link may be down, or the cellular radio exchange may not receive TCP/IP email for a long period of time.

FIG. 3 illustrates a second conventional technique for deactivating a cellular radiotelephone system that has not paid its bills, by sending a "shut down" email message via a TCP/IP links 150a–150n. As shown in FIG. 4, when a "shut down" message is received at Block 402, the cellular system deactivates itself at Block 404. Accordingly, inadvertent shutdown of a cellular radiotelephone system that has paid its bills may be prevented.

Notwithstanding the above discussion, there continues to be a need for improved systems and methods for deactivating a cellular radiotelephone system by a cellular operator system, for example for nonpayment of bills.

SUMMARY OF THE INVENTION

The present invention includes systems and methods for deactivating a cellular radiotelephone system including a Cellular Radio Exchange (CRE) and a plurality of radio heads (base stations), by sending an email including a deactivation message to the CRE via a communications protocol other than TCP/IP, such that the CRE deactivates the cellular radiotelephone system in response to receipt of the email including the deactivation message. Preferably, the email including the deactivation message is sent to the CRE via ANSI-41 communications protocol that is also used to communicate messages for automatic roaming, authentication, voice privacy and other services. Most preferably, the email including the deactivation message is sent to the CRE via ANSI-41 Short Message Service (SMS) communications protocol that supports email between a cellular operator system and a cellular radiotelephone system.

The present invention stems from the realization that the sending of a "keep alive" or "shut down" message via TCP/IP email over an internet link or dial-up modem may be fraught with problems. For example, if the TCP/IP email link is not operational, a "keep alive" signal may not be received by a cellular radiotelephone system that has paid its bill, and the cellular radiotelephone system may inadvertently deactivate itself. Conversely, the sending of a "shut down" signal to a cellular radiotelephone system that has not paid its bill may be prevented by the cellular radiotelephone system that has not paid its bill, by disabling the TCP/IP link.

In sharp contrast, the present invention uses an ANSI-41 link and preferably an ANSI-41 SMS link, that generally needs to be active in order for the cellular radiotelephone system to be operational. Thus, since the ANSI-41 SMS link will generally be operational, and will not be inadvertently or deliberately disabled by the cellular radiotelephone system, the "keep alive" or "shut down" message may be reliably sent to the cellular radiotelephone system.

More specifically, according to the present invention, a cellular operator system that communicates with a plurality of cellular radiotelephone systems each including a CRE, identifies that a selected cellular radiotelephone system is to be deactivated. An email including a deactivation message is sent by the cellular operator system to the corresponding CRE, via a communications protocol other than TCP/IP, and preferably via ANSI-41 SMS, such that the CRE deactivates the selected cellular radiotelephone system in response to receipt of the email including the deactivation message.

The cellular operator system preferably includes a central service node and a cellular message center that communicates with the central service node via TCP/IP communications protocol. A cellular home location register communicates with the cellular message center and with the cellular radiotelephone systems via ANSI-41 SMS communications protocol. The email including the deactivation message is sent from the cellular service node to the cellular message center via the TCP/IP communications protocol. The cellular message center converts the email including the deactivation message from TCP/IP to the ANSI-41 SMS communications protocol. The converted email is sent from the cellular message center to the cellular home location register via ANSI-41 SMS communications protocol. The cellular home location register sends the converted email to the CRE of the selected radiotelephone system via the ANSI-41 SMS communications protocol. As described above, the deactivation message may be a "shut down" message to shut down a selected cellular radiotelephone system upon receipt thereof. Alternatively, the deactivation message may be a "keep alive" message, such that the CRE deactivates the selected cellular radiotelephone system in response to failure to receive the "keep alive" message within a predetermined time.

The deactivation message may be processed by a cellular radiotelephone system including a CRE, by receiving the email including the deactivation message at the CRE via a communications protocol other than TCP/IP, preferably ANSI-41 and most preferably ANSI-41 SMS. A "fictitious" radiotelephone is assigned at the CRE for receipt of the ANSI-41 SMS deactivation email. The received email is sent to the fictitious radiotelephone using ANSI-41 SMS communications protocol. The fictitious radiotelephone converts the ANSI-41 SMS email to a TCP/IP email. The converted email is then used to deactivate the cellular radiotelephone system.

Accordingly, a deactivate message is sent on a message link that generally needs to be operational in order for the cellular radiotelephone system to operate properly. By embedding the email in a communications protocol other than standard TCP/IP for which it was generally intended, failure to receive a "keep alive" message or a "shut down" message may be reduced. It will also be understood that the present invention may also be used for improved programming of a cellular radiotelephone system, by sending messages other than a deactivation message on a message link that generally needs to be operational in order for the cellular radiotelephone system to operate properly, such as an ANSI-41 SMS link.

BRIEF DESCRIPTION OF THE DRAWINGS

FIG. 3 is a block diagram illustrating the sending of a "shut down" message from a cellular operator system to cellular radiotelephone systems according to the prior art.

FIG. 7 is a flowchart illustrating registration according to the present invention.

FIG. 8 is a flowchart illustrating deactivation according to the present invention.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
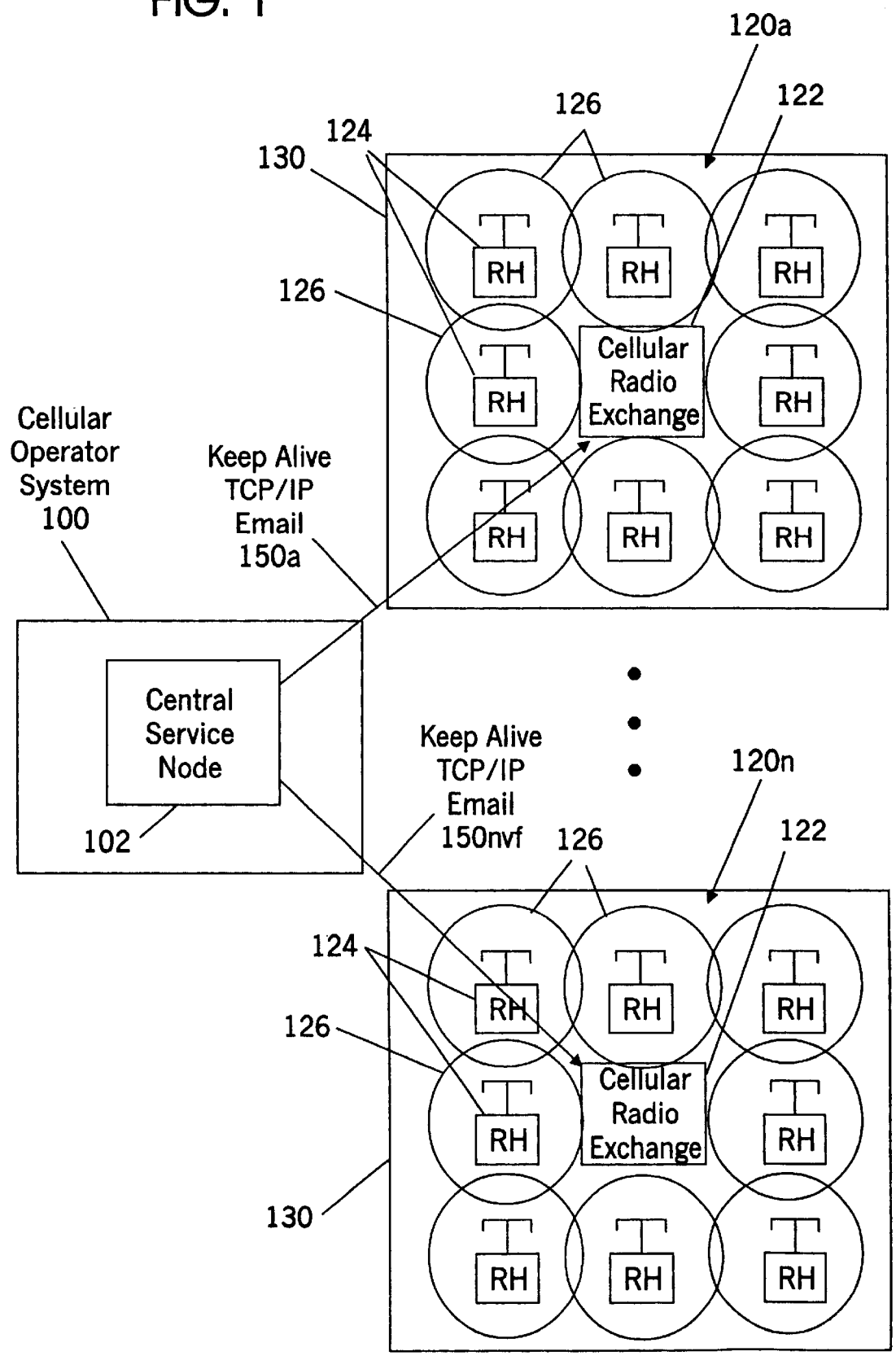
FIG. 1 is a block diagram illustrating the sending of a "keep alive" message from a cellular operator system to cellular radiotelephone systems according to the prior art.
Figure 2:
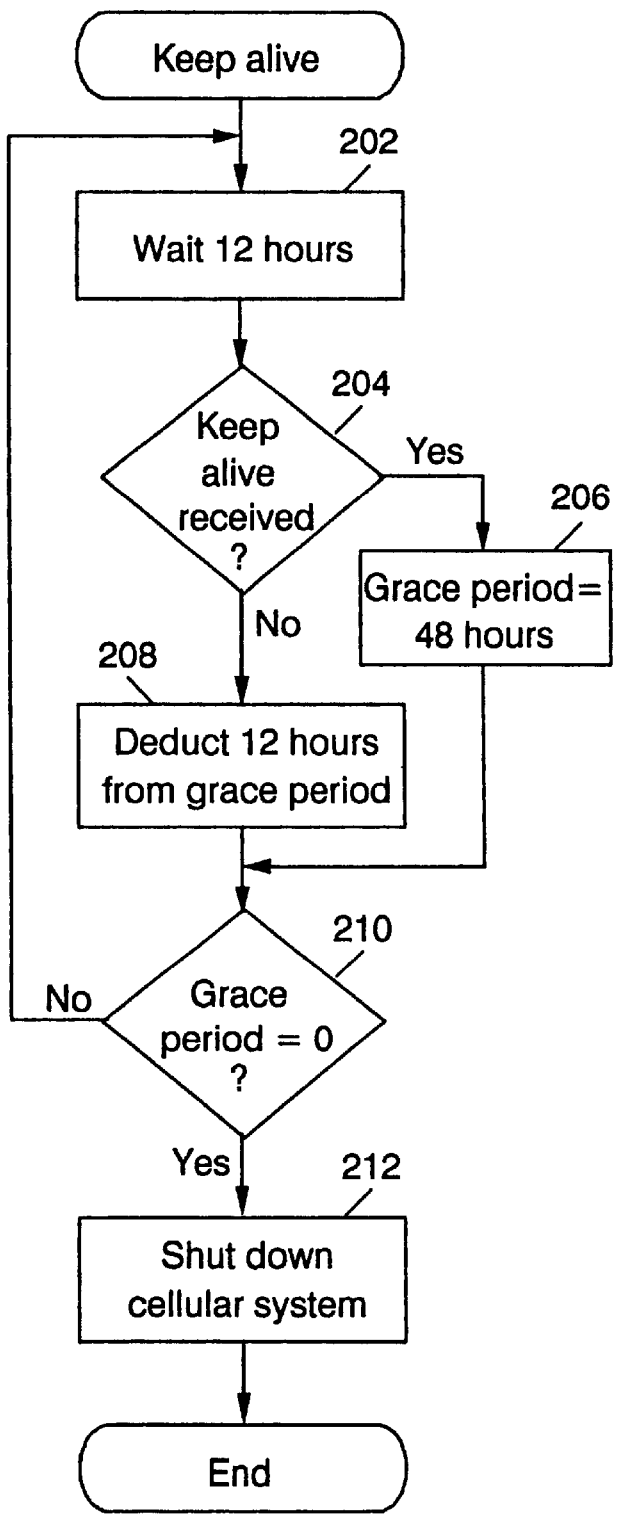
FIG. 2 is a flowchart illustrating the "keep alive" function of FIG. 1 according to the prior art.
Figure 4:
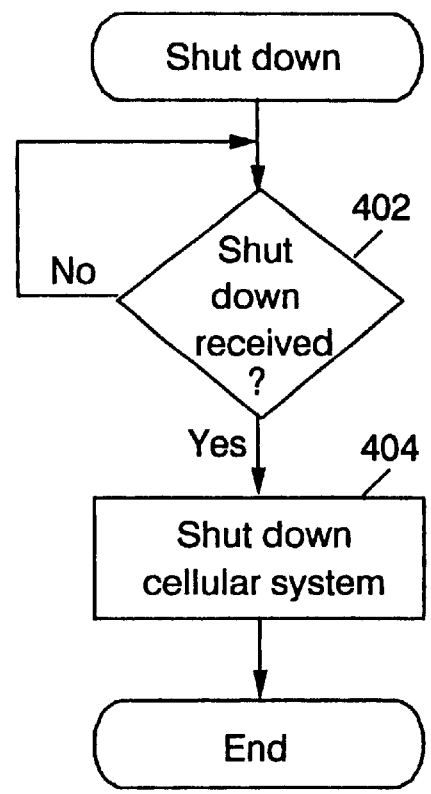
FIG. 4 is a flowchart illustrating the "shut down" function of FIG. 3.
Figure 5:
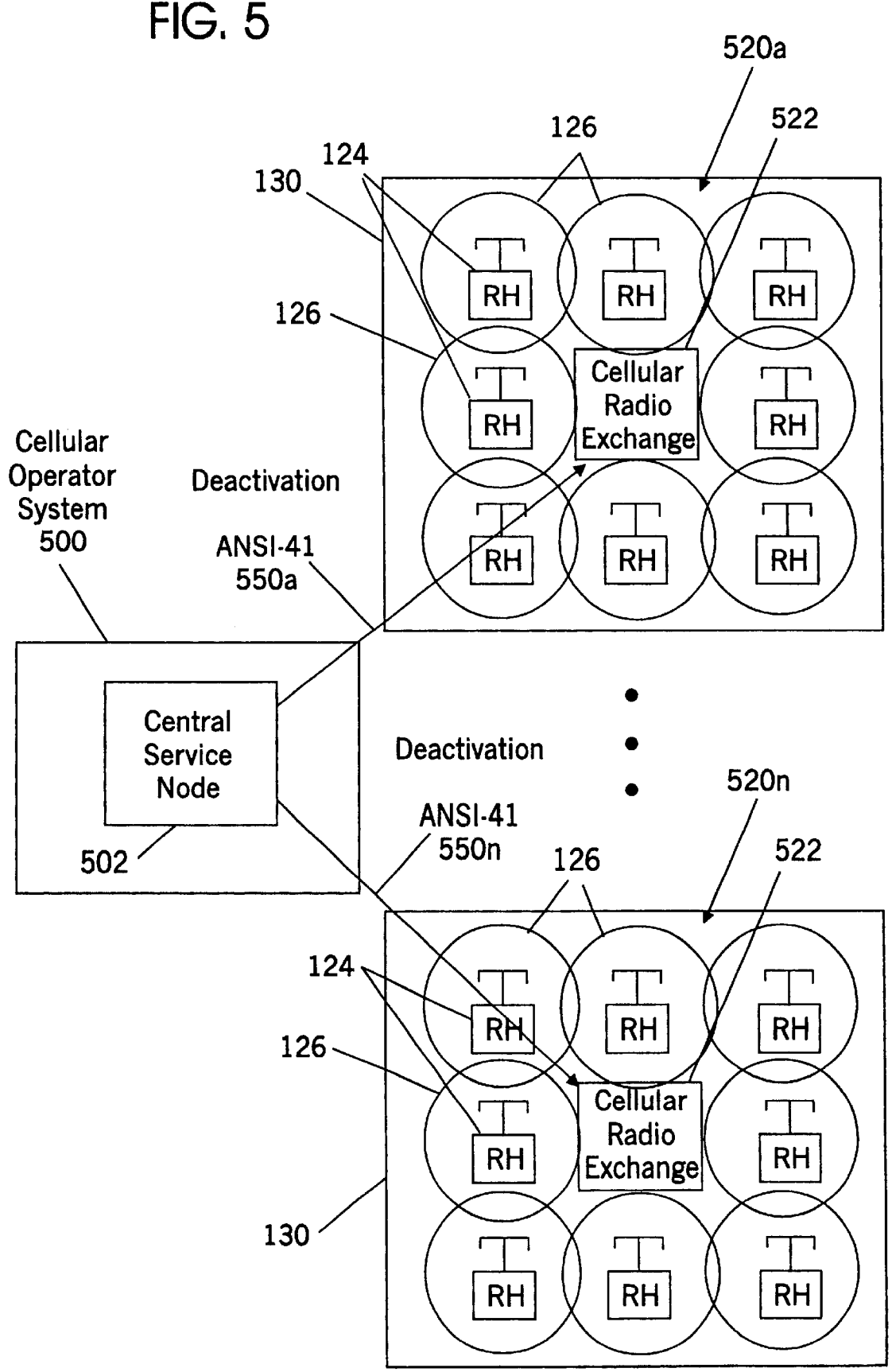
FIG. 5 is a block diagram of systems and methods for deactivating a cellular radiotelephone system according to the present invention.

Referring now to FIG. 5, systems and methods for deactivating a cellular radiotelephone system according to the present invention will now be described. As shown in FIG. 5, a cellular operator system 500 including a central service node 502 communicates with a plurality of cellular radiotelephone systems 520a–520n. Each of the cellular radiotelephone systems 520a–520n includes a cellular radio exchange 522 that communicates with a plurality of base stations 124 in a plurality of cells 126, as was already described. Cellular radiotelephone systems 520a–520n may be Wireless Office Systems that are located on a floor 130 of a building, as was already described.

Still referring to FIG. 5, a deactivation message is communicated from the cellular operator system 500 to the cellular radiotelephone systems 520a–520n using an ANSI-41 SMS communications link 550a–550n. ANSI-41 communications protocol including SMS are described in ANSI-41, Chapters, 3, 5 and 6 and ANSI-664, Chapter 6, and earlier and later versions thereof, the disclosure of which is hereby incorporated herein by reference. As is well known to those having skill in the art, the ANSI-41 links 550a–550n conventionally provide messages for automatic roaming, authentication, voice privacy and other services that are used by the cellular radiotelephone systems 520a–520n. Moreover, ANSI-41 supports email between a message center and a mobile radiotelephone using SMS.

Accordingly, by sending an email using ANSI-41 SMS, there can be a high likelihood that the deactivation message signal will reach the appropriate cellular radiotelephone system. In particular, the ANSI-41 SMS link is generally always operational, to provide the above-mentioned services to the cellular radiotelephone system. Moreover, the functionality of the cellular radiotelephone system may be greatly reduced if the operator of the cellular radiotelephone system disables the ANSI-41 SMS link. Accordingly, improved systems and methods for deactivating a cellular radiotelephone system may be provided.

As was described above, ANSI-41 supports email between a message center and a mobile radiotelephone using SMS. According to the invention, a fictitious radiotelephone is assigned at the cellular radiotelephone system. In order to send the deactivation message, an email is sent to the fictitious radiotelephone at the cellular radiotelephone system using ANSI-41 SMS communications protocol.

Figure 6:
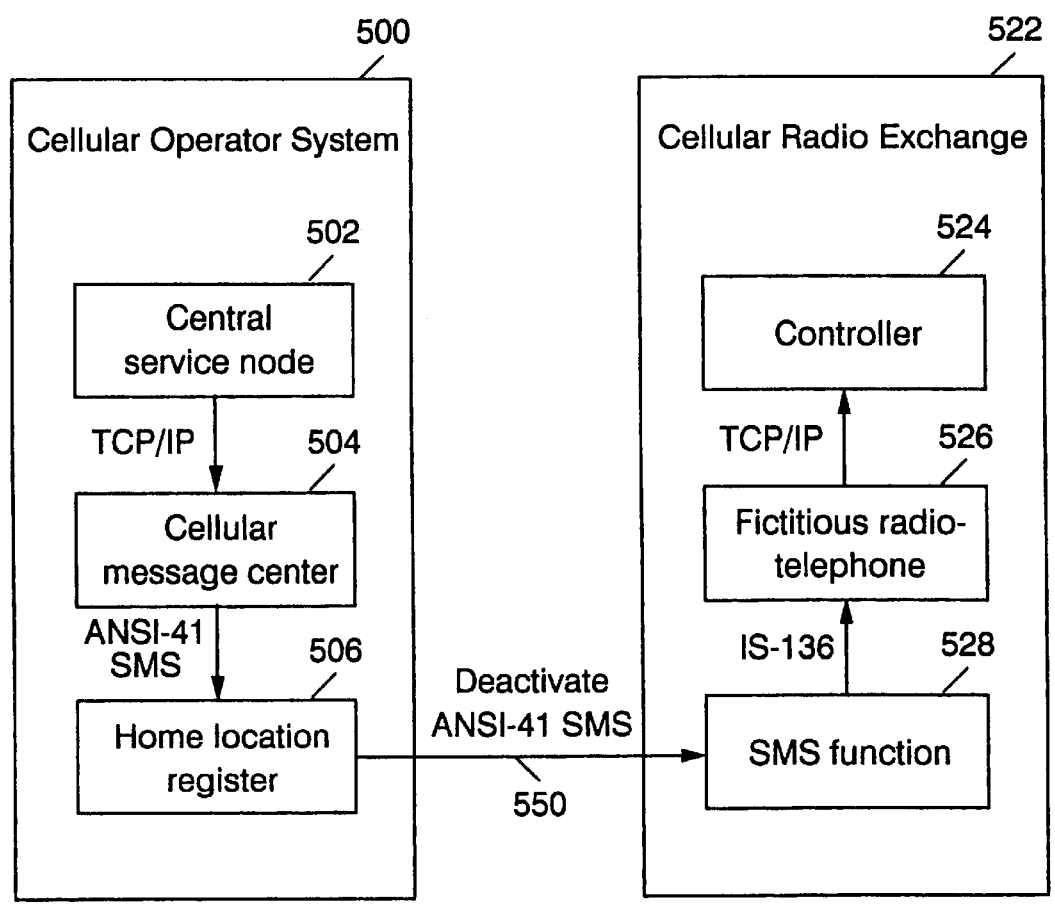
FIG. 6 is a block diagram of a cellular operator system and a cellular radio exchange according to the present invention.

FIG. 6 illustrates an embodiment of the present invention using a fictitious radiotelephone number. Only one CRE is illustrated for clarity. Referring now to FIG. 6, the cellular operator system 500 includes a central service node 502 that identifies a selected cellular radiotelephone system that is to be deactivated. A cellular message center 504 receives email messages from the central service node 502 and from other sources via TCP/IP. The cellular message center 504 converts received email to ANSI-41 SMS communications protocol and provides the email to a home location register 506. The home location register 506 sends a deactivation message as an email in ANSI-41 SMS protocol over link 550. At the CRE 522, an SMS function 528 receives the ANSI-41 SMS message and provides the SMS message to the fictitious radiotelephone 526. The fictitious radiotelephone 526 converts the ANSI-41 SMS message to an email, and provides the email message to controller 524 which deactivates the CRE 522.

FIGS. 7 and 8 illustrate registration and deactivation according to the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps such as is described in FIGS. 7 and 8, or by combinations of special purpose hardware and computer instructions.

Prior to activation of the cellular radiotelephone system, the controller 524 is programmed to contain its email address, and the fictitious radiotelephone 526 is programmed to contain its cellular phone number (also referred to as a Mobile Identification Number or MIN) and the associated email address of the controller 524. The cellular service node 502 is programmed to send an email to the controller function 524 and the cellular message center 504 is programmed to associate an email address to a subscriber. The home location register 506 is programmed to include the fictitious radiotelephone 526 as a subscriber with a specific MIN.

Referring now to FIG. 7, registration of the fictitious radiotelephone 526 with the home location register 506 will now be described. As shown in Block 702, upon startup of the cellular radiotelephone system, the fictitious radiotelephone 526 registers with the SMS function 528 by providing its MIN. At Block 704, the SMS function registers the MIN with the home location register 506. At Block 706, the home location register acknowledges the registration and at Block 708 the acknowledgement is passed by the SMS function 528 to the fictitious radiotelephone 526. These operations may be used to register any radiotelephone with a home location register. However, according to the present invention, the radiotelephone is a fictitious radiotelephone that is used to receive the deactivation message from the cellular operator system 500.

Referring now to FIG. 8, deactivation of a cellular radiotelephone system according to the present invention will now be described. At Block 802, the central service node 502 identifies a selected cellular system 520a–520n to be deactivated, for example for nonpayment of bills. At Block 804, the central service node 502 sends a conventional TCP/IP email to the cellular message center 504. The cellular message center 504 converts the TCP/IP email to an ANSI-41 SMS email at Block 806. At Block 808, the cellular message center 504 sends the ANSI-41 SMS email to the home location register 506.

Still referring to FIG. 8, at Block 810, the home location register sends the ANSI-41 SMS email to the SMS function 528 of the cellular system. The ANSI-41 SMS email message preferably includes the MIN of the fictitious radiotelephone 526. At Block 812, the SMS function 528 receives the ANSI-41 SMS email and sends the ANSI-41 SMS email to the fictitious radiotelephone 526, for example using IS-136 communications protocol. As is well known to those having skill in the art, IS-136 communications protocol is conventionally used to send SMS messages to cellular radiotelephones.

At Block 814, the fictitious radiotelephone 526 converts the SMS message to a conventional TCP/IP email. At Block 816, the fictitious radiotelephone 526 sends the TCP/IP email to the controller 524. The controller deactivates the cellular system in response to receipt of the email at Block 818. It will be understood that the deactivation message may be a "keep alive" message, a "shut down" message or other message.

In summary, the cellular operator defines each cellular radiotelephone system under the operator's control as a fictitious radiotelephone in the home location register. The fictitious radiotelephone is assigned a cellular telephone number. In the cellular message center, the fictitious radiotelephone is given an email address which is associated with the assigned cellular telephone number. The cellular radio exchange includes an SMS function that communicates with the home location register to notify the home location register where to send a specific phone call or message in order to reach the fictitious radiotelephone number. The cellular radio exchange also defines the fictitious radiotelephone as a function which performs the same actions regarding registrations and when receiving an SMS as a conventional radiotelephone.

When the cellular radiotelephone system is activated, the fictitious radiotelephone registers with the home location register according to conventional registration procedures. Thus, messages to the fictitious radiotelephone are sent to the cellular radio exchange. When the central service node wishes to send a message to the cellular radiotelephone system, it sends an email to the fictitious radiotelephone. This email is received by the cellular message center, where the email is transferred to one or more SMS messages. These SMS messages are sent to the fictitious radiotelephone via ANSI-41 SMS communications protocol. When the messages are received by the fictitious radiotelephone number, they are converted back into an email. This email is sent to the controller.

Accordingly, the present invention may be used by a cellular operator system to remotely and reliably program the associated cellular radiotelephone systems, including the deactivation of a selected cellular radiotelephone system. An email including a deactivation message is sent from a cellular operator system to a cellular radiotelephone system embedded in a conventional ANSI-41 SMS that is sent to a fictitious radiotelephone in the cellular radiotelephone system. Thus, there may be a high likelihood that the deactivation message will be received, and it may be difficult to block the deactivation message.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of deactivating a cellular radiotelephone system including a Cellular Radio Exchange (CRE) and a plurality of radio heads, wherein the CRE communicates with a cellular operator system using a short message service (SMS) communications protocol, the cellular operator system including a central service node, a cellular message center that communicates with the central service node via a TCP/IP communications protocol and a cellular home location register that communicates with the cellular message center via the SMS communications protocol, the method comprising the step of:

sending the email including the deactivation message to the CRE via the SMS communications protocol, such that the CRE deactivates the cellular radiotelephone system in response to receipt of the email including the deactivation message; the sending step comprising the steps of:

sending an email including a deactivation message from the central service node to the cellular message center via TCP/IP communications protocol;

converting the email including the deactivation message from TCP/IP communications protocol to SMS communications protocol;

sending the email including the deactivation message from the cellular message center to the cellular home location register via the SMS communications protocol; and sending the email including the deactivation message from the cellular home location register to the CRE via the SMS communications protocol.

2. A method according to claim 1 wherein the step of sending the email including the deactivation message to the CRE via the SMS communication protocol comprises the step of sending an email including a keep alive message to the CRE via the SMS communications protocol, such that the CRE deactivates the cellular radiotelephone system in response to failure to receive the email including the keep alive message within a predetermined time.

3. A method of deactivating a cellular radiotelephone system including a Cellular Radio Exchange (CRE) and a plurality of radio heads, wherein the CRE communicates with a cellular operator system using a Short Message Service (SMS) communications protocol, the cellular operator system including a central service node, a cellular message center that communicates with the central service node via a TCP/IP communications protocol and a cellular home location register that communicates with the cellular message center via the SMS communications protocol, the method comprising the step of:

sending an email including a deactivation message to the CRE via a Short Message Service (SMS) communications protocol, such that the CRE deactivates the cellular radiotelephone system in response to receipt of the email including the deactivation message via the SMS communications protocol, wherein the sending step comprises the steps of:

sending the email including the deactivation message from the central service node to the cellular message center via TCP/IP communications protocol;

converting the email including the deactivation message from TCP/IP communications protocol to the SMS communications protocol;

sending the email including the deactivation message from the cellular message center to the cellular home location register via the SMS communications protocol; and sending the email including the deactivation message from the cellular home location register to the CRE via the SMS communications protocol.

4. A method according to claim 3 wherein the step of sending an email including a deactivation message to the CRE via the SMS communications protocol comprises the step of sending an email including a keep alive message to the CRE via the SMS communications protocol, such that the CRE deactivates the cellular radiotelephone system in response to failure to receive the email including the keep alive message within a predetermined time.

5. A method of deactivating a cellular radiotelephone system including a Cellular Radio Exchange (CRE) and a plurality of radio heads, the method comprising the steps of:

receiving an email including a deactivation message at the CRE via a Short Message Service (SMS) communications protocol; and deactivating the cellular radiotelephone system in response to receipt of the email via the SMS communications protocol, the email including the deactivation message at the CRE; and wherein the receiving step comprises the steps of:
assigning a fictitious radiotelephone at the CRE;
sending the received email to the fictitious radiotelephone via the SMS communications protocol; and
converting the received email to a TCP/IP email; and wherein the deactivating step comprises the step of:
deactivating the cellular radiotelephone system in response to receipt of the TCP/IP email.

6. A method according to claim 5:

wherein the step of receiving an email including a deactivation message at the CRE via the SMS communication protocol comprises the step of receiving an email including a keep alive message at the CRE via the SMS communications protocol; and wherein the step of deactivating the cellular radiotelephone systems in response to receipt of the email via the SMS communications protocol comprises the step of deactivating the cellular radiotelephone system in response to failure to receive the email including the keep alive message within a predetermined time.

7. A method of deactivating a cellular radiotelephone system including a Cellular Radio Exchange (CRE) and a plurality of radio heads, the method comprising the steps of:

receiving an email including a deactivation message at the CRE via a Short Message Service (SMS) communications protocol; and deactivating the cellular radiotelephone system in response to receipt of the deactivation message at the CRE via the SMS communications protocol;

wherein the receiving step comprises the steps of:
assigning a fictitious radiotelephone number at the CRE; sending the received email to the fictitious radiotelephone number via the SMS communications protocol; and
converting the SMS email to a TCP/IP email; and wherein the deactivating step comprises the step of:
deactivating the cellular radiotelephone system in response to receipt of the TCP/IP email.

8. A method according to claim 7:

wherein the step of receiving an email including a deactivation message at the CRE via the SMS communication protocol comprises the step of receiving an email including a keep alive message at the CRE via the SMS communications protocol; and wherein the step of deactivating the cellular radiotelephone systems in response to receipt of the email via the SMS communications protocol comprises the step of deactivating the cellular radiotelephone system in response to failure to receive the email including the keep alive message within a predetermined time.

9. A cellular operator system that communicates with a plurality of cellular radiotelephone systems, each including a corresponding Cellular Radio Exchange (CRE), the cellular operator system comprising:

a central service node;

a cellular message center that communicates with the central service node via a TCP/IP communications protocol; and a cellular home location register that communicates with the cellular message center and with the cellular radiotelephone systems via a Short Message Service (SMS) communications protocol;

means for identifying that a selected cellular radiotelephone system is to be deactivated;

means for sending an email including a deactivation message to the CRE that corresponds to the selected cellular radiotelephone system, via the SMS communications protocol, such that the CRE deactivates the selected cellular radiotelephone system in response to receipt of the email including the deactivation message; the means for sending comprising means for sending the email including the deactivation message from the central service node to the cellular message center via the TCP/IP communications protocol;

the cellular message center comprising means for converting the email including the deactivation message from the TCP/IP protocol to the SMS communications protocol and means for sending the converted email from the cellular message center to the cellular home location register via the SMS communications protocol; and the cellular home location register comprising means for sending the converted email to the CRE of the selected cellular radiotelephone system via the SMS communications protocol.

10. A system according to claim 9 wherein the means for sending an email including a deactivation message to the CRE comprises means for sending an email including a keep alive message to the CRE that corresponds to the selected cellular radiotelephone system, via the SMS communications protocol, such that the CRE deactivates the selected cellular radiotelephone system in response to failure to receive the email including the keep alive message within a predetermined time.

11. A cellular operator system that communicates with a plurality of cellular radiotelephone systems, each including a corresponding Cellular Radio Exchange (CRE), the cellular operator system comprising:

a central service node;

a cellular message center that communicates with the central service node via a TCP/IP communications protocol; and a cellular home location register that communicates with the cellular message center and with the cellular radiotelephone systems via a Short Message Service (SMS) communications protocol;

means for identifying that a selected cellular radiotelephone system is to be deactivated; and means for sending an email including a deactivation message to the CRE that corresponds to the selected cellular radiotelephone system, via the SMS communications protocol, such that the CRE deactivates the selected cellular radiotelephone system in response to receipt of the email including the deactivation message via the SMS communications protocol, wherein the means for sending further comprises means for sending the email including the deactivation message from the central service node to the cellular message center via the TCP/IP communications protocol;

the cellular message center comprising means for converting the email including the deactivation message from the TCP/IP protocol to the SMS communications protocol and means for sending the converted email from the cellular message center to the cellular home location register via the SMS communications protocol; and the cellular home location register comprising means for sending the converted email to the CRE of the selected cellular radiotelephone system via the SMS communications protocol.

12. A system according to claim 11 wherein the sending means comprises means for sending an email including a keep alive message to the CRE that corresponds to the selected cellular radiotelephone system, via a communications protocol other than TCP/IP, such that the CRE deactivates the selected cellular radiotelephone system in response to failure to receive the email including the deactivation message within a predetermined time.

13. A cellular radiotelephone system including a Cellular Radio Exchange (CRE) that communicates with a cellular operator system and a plurality of radio heads, the cellular radiotelephone system comprising:

means for receiving an email including a deactivation message at the CRE via a Short Message Service (SMS) communications protocol; and means for deactivating the cellular radiotelephone system in response to receipt of the email via the SMS communications protocol, the email including the deactivation message at the CRE;

wherein the receiving means comprises:
a fictitious radiotelephone at the CRE;
means for sending the received email to the fictitious radiotelephone number via the SMS communications protocol; and
means for converting the email to a TCP/IP protocol; and wherein the deactivating means comprises:
means for deactivating the cellular radiotelephone system in response to receipt of the converted email.

14. A system according to claim 13:
wherein the means for receiving an email including a deactivation message at the CRE comprises means for receiving an email including a keep alive message at the CRE via the SMS communications protocol; and
wherein the means for deactivating the cellular radiotelephone system in response to receipt of the email via the SMS communications protocol comprises means for deactivating the cellular radiotelephone system in response to failure to receive the email including the deactivation message within a predetermined time.

15. A cellular radiotelephone system including a Cellular Radio Exchange (CRE) that communicates with a cellular operator system and a plurality of radio heads, the cellular radiotelephone system comprising:

means for receiving an email including a deactivation message at the CRE via a Short Message Service (SMS) communications protocol; and means for deactivating the cellular radiotelephone system in response to receipt of the deactivation message via the SMS communications protocol;

wherein the receiving means comprises:
a fictitious radiotelephone number at the CRE;
means for sending the received email to the fictitious radiotelephone number via the SMS communications protocol; and
means for converting the SMS email to a TCP/IP email; and wherein the deactivating means comprises:
means for deactivating the cellular radiotelephone system in response to receipt of the TCP/IP email.

16. A system according to claim 15:
wherein the means for receiving an email including a deactivation message at the CRE comprises means for receiving an email including a keep alive message at the CRE via the SMS communications protocol; and
wherein the means for deactivating the cellular radiotelephone system in response to receipt of the email via the SMS communications protocol comprises means for deactivating the cellular radiotelephone system in response to failure to receive the email including the deactivation message within a predetermined time.

17. A method of programming a cellular radiotelephone system including a Cellular Radio Exchange (CRE) and a plurality of radio heads, wherein the CRE communicates with a cellular operator system using a Short Message Service (SMS) communications protocol, the cellular operator system including a central service node, a cellular message center that communicates with the central service node via a TCP/IP communications protocol and a cellular home location register that communicates with the cellular message center via a SMS communications protocol, the method comprising the steps of:

sending an email including a programming message to the CRE via the SMS communications protocol, such that the CRE programs the cellular radiotelephone system in response to receipt of the email via the SMS communications protocol, the email including the programming message, the sending step comprising the steps of:

sending the email including the programming message from the central service node to the cellular message center via TCP/IP communications protocol;

converting the email including the programming message from TCP/IP communications protocol to the SMS communications protocol;

sending the email including the programming message from the cellular message center to the cellular home location register via the SMS communications protocol; and sending the email including the programming message from the cellular home location register to the CRE via the SMS communications protocol.

* * * * *

UNITED STATES PATENT AND TRADEMARK OFFICE
CERTIFICATE OF CORRECTION

PATENT NO. : 6,289,214 B1  
DATED : September 11, 2001  
INVENTOR(S) : Olof Tomas Backstrom It is certified that error appears in the above-identified patent and that said Letters Patent is hereby corrected as shown below:

<u>Title page, Item [54] and Column 1, lines 1-4,</u>  
Change the title to -- SYSTEMS AND METHODS FOR DEACTIVATING A CELLULAR RADIOTELEPHONE SYSTEM USING SHORT MESSAGE SERVICE EMAIL --

Signed and Sealed this

Twenty-fifth Day of June, 2002

*Attest:*

JAMES E. ROGAN  
*Attesting Officer*  *Director of the United States Patent and Trademark Office*